United States Patent
Romanowski

[15] 3,646,970
[45] Mar. 7, 1972

[54] FLOW CONTROL UNIT FOR BELLOWS CONTROLLED SUDDEN PRESSURE RISE RELAY

[72] Inventor: Robert F. Romanowski, Rochester, N.Y.
[73] Assignee: Qualitrol Corporation, Fairport, N.Y.
[22] Filed: June 1, 1970
[21] Appl. No.: 42,280

Related U.S. Application Data

[63] Continuation-in-part of Ser. No. 829,464, June 2, 1969, Pat. No. 3,535,878.

[52] U.S. Cl.................................................138/46, 137/468
[51] Int. Cl...........................................F15d 1/02, F15d 1/14
[58] Field of Search ........... 138/45, 46; 137/468; 263/82, 93, 236/99

[56] References Cited

UNITED STATES PATENTS

| | | | |
|---|---|---|---|
| 1,219,516 | 3/1917 | Whittelsey | 236/93 |
| 1,888,225 | 11/1932 | Hetherington | 236/93 |
| 2,421,713 | 6/1947 | Porter | 138/46 |
| 2,715,420 | 8/1955 | Stearns | 132/45 |

Primary Examiner—Herbert F. Ross
Attorney—Stephen J. Rudy

[57] ABSTRACT

A relay unit designed for association with a fluid cooled transformer apparatus. The relay acts by means of a hydraulic bellows system to sense internal pressure variations in a tank member of the transformer apparatus; and it responds to a sudden rise in the pressure to actuate an alarm switch. The system includes a bellows which senses the pressure variation, and responds by forcing liquid in the system through a common chamber and connecting passages to each to a pair of pressure responsive bellows. The passage to one of the pair of bellows is relatively restricted as compared to that to the other, so that when a sudden pressure rise develops the system liquid flows in greater volume to one of the bellows than to the other. This causes differential expansion of the pair of bellows and consequent upsetting of linkage controlling operation of the switch. An orifice flow control unit removably inserted in the common chamber includes a thermostatic blade overlying the restricted passage. The blade responds to temperature changes in the bellows system liquid so as to move closer to or further clear of the restricted passage. In this manner, it serves to regulate and to maintain a constant rate of flow of the system liquid through the restricted passage over an operating range of −40° to 100° C.

3 Claims, 7 Drawing Figures

INVENTOR
ROBERT F. ROMANOWSKI
BY Stephen J. Rudy
ATTORNEY

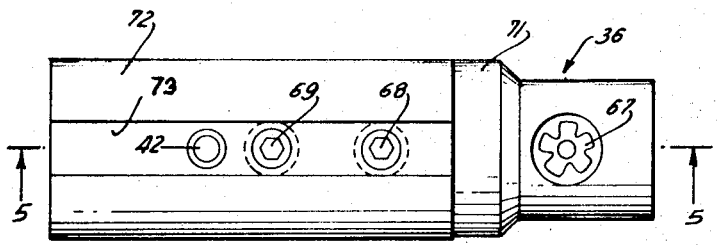
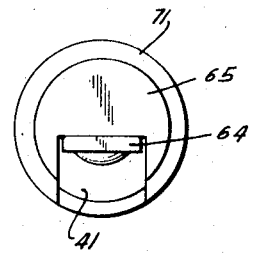
FIG. 3
FIG. 4
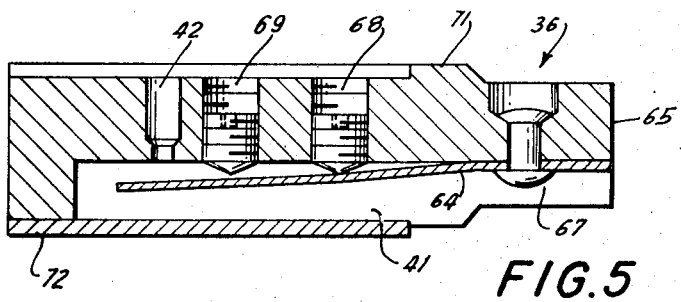
FIG. 5
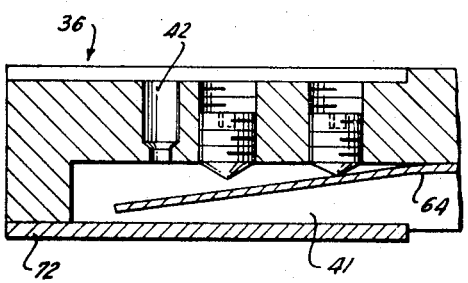
FIG. 6
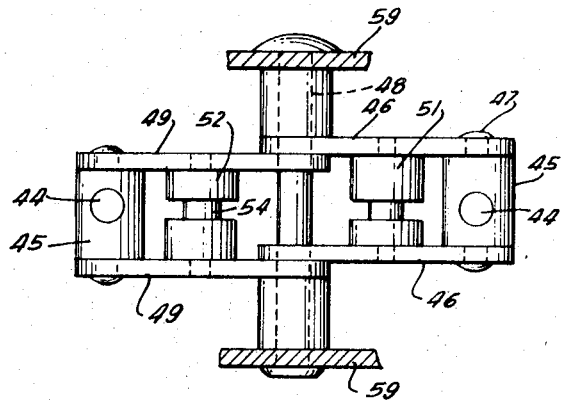
FIG. 2
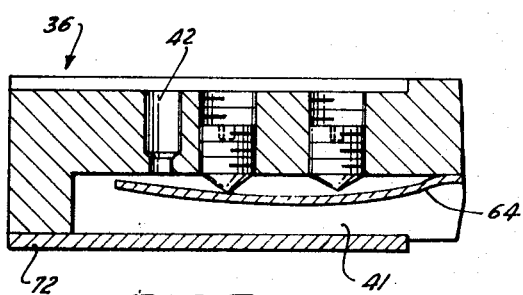
FIG. 7
INVENTOR
ROBERT F. ROMANOWSKI
BY Stephen J. Rudy
ATTORNEY

FLOW CONTROL UNIT FOR BELLOWS CONTROLLED SUDDEN PRESSURE RISE RELAY

This application is a division of my copending application Ser. No. 829,464, filed June 2, 1969, now Pat. No. 3,535,878 dated Oct. 27, 1970.

This invention is concerned with a flow control unit for fluid bellows system controlled relay unit of a type designed to operate an alarm switch in response to a sudden rise in the internal pressure of a tank apparatus with which the relay is associated.

The relay is especially suited for use as a protective device for a fluid cooled transformer apparatus.

The relay includes a group of three bellows connected with one another through a common chamber in a closed fluid filled hydraulic system. When pressure is applied to a first one of the bellows, herein characterized as a pressure sensing bellows, the other two are caused to expand as a consequence of the fluid being forced through the system. Because of a relatively restricted connection with the system, one of the two bellows will expand relatively faster than the other when a sudden pressure increase is applied to the sensing bellows. This relative expansion will cause an alarm switch to be operated. The relay is intended for operation in a range of −40° to 100° C. The viscosity of the bellows fluid is high at cold temperature and low at hot temperature. To obtain a proper relay response over this wide temperature range, it is essential that the flow rate of the bellows fluid through the restricted passage to the related bellows be substantially constant.

The general object of the invention is to provide an automatic control which will be responsive to ambient temperature to enlarge the passage of fluid through the restricted passage in the bellows system when the fluid viscosity is high and to restrict the passage of fluid when the fluid viscosity is low.

This is accomplished by means of a flow control unit removably insertable in the bellows system which includes a thermostatic blade associated with a restricted orifice of a predetermined size. The blade responds to hot temperature to restrict the passage of fluid through the orifice; and responds to cold temperature to increase the passage of fluid through the orifice.

BRIEF DESCRIPTION OF DRAWING

In the accompanying drawing:

FIG. 2 is a detail in top plan of the bellows linkage;

FIG. 3 is an enlarged detail in plan of the control unit;

FIG. 4 is a right end view of FIG. 3;

FIG. 5 is a section taken on line 5—5 of FIG. 3;

FIG. 6 is a fragmentary section illustrating the deflection of the blade relative to the orifice under an ambient cold temperature condition; and FIG. 7 is a view similar to FIG. 6 but showing the flexed condition of the blade under an ambient hot temperature condition.

DESCRIPTION OF PREFERRED EMBODIMENT

Figure 1:
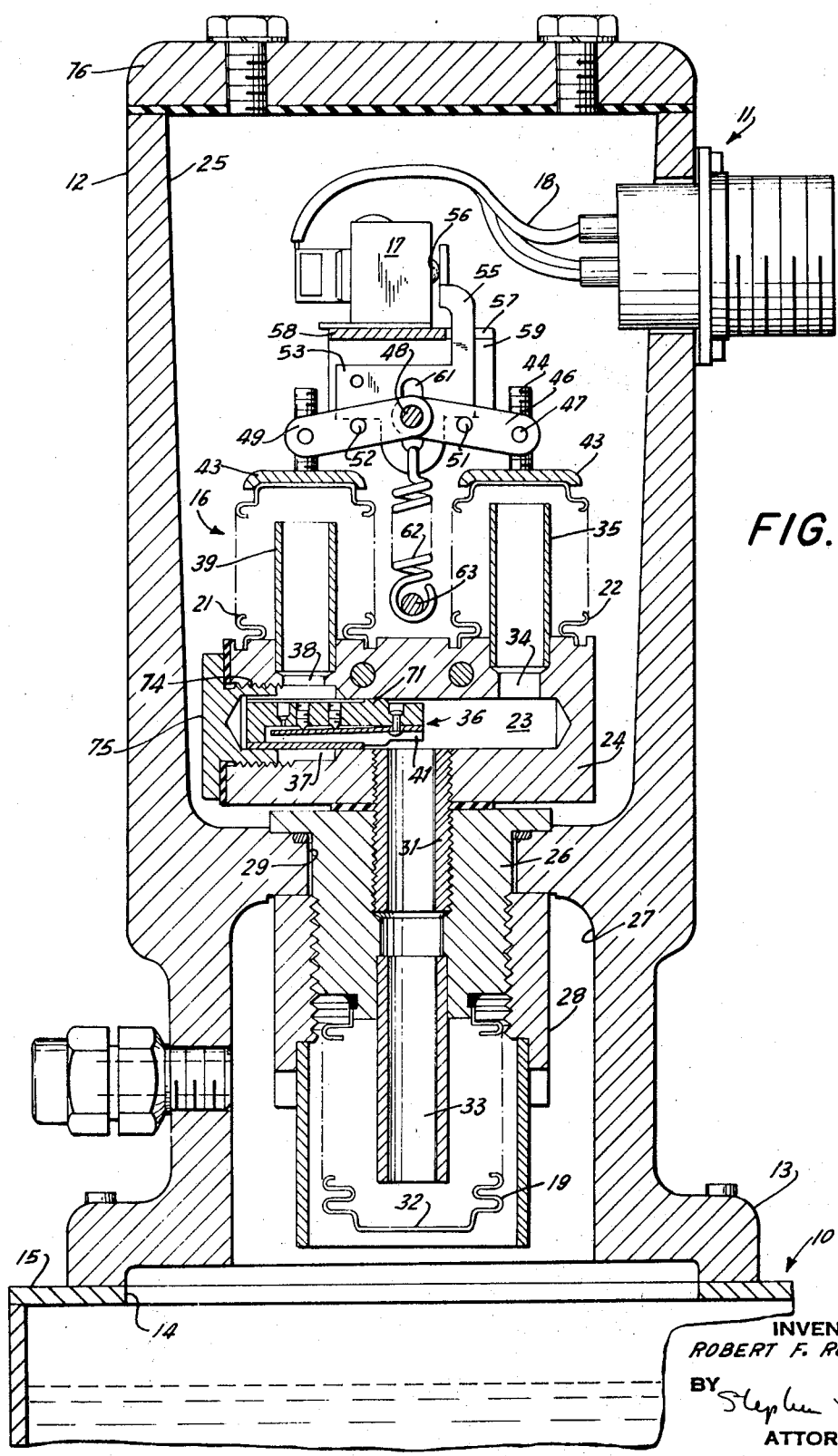
FIG. 1 is a vertical section of a relay unit embodying the invention, a fragmentary portion of a fluid cooled electrical transformer apparatus to which the relay has been applied is also shown.

Reference is now directed to the drawing wherein is shown a conventional fluid cooled electrical transformer apparatus 10 to which a protective relay unit 11 has been applied.

The relay 11 includes an upright housing 12 having a mounting flange 13 mounted over an opening 14 in the top wall of a tank member 15 of the transformer apparatus. The tank is sealed and contains the usual cooling fluid in which the usual electrical transformer (not shown) is immersed. The relay includes a closed hydraulic bellows circuit system 16 which responds to a sudden rise developing in the internal pressure of the tank to operate an alarm switch 17 in an electrical control circuit 18. The system also responds to normal pressure changes in the tank but without actuating the switch.

The system 16 includes a group of three bellows 19, 21 and 22, of which bellows 19 serves to sense pressure changes in the tank; and the other two respond to the pressure sensed in controlling operation of the switch. The interiors of the three bellows are connected with one another through a common chamber 23 formed in a supporting block 24. The block is located in an upper compartment 25 of the housing, which compartment is sealed by means of a plug bushing 26 from a recess 27. The latter opens through the bottom of the housing. The bushing is retained by means of a collar nut 28 in an opening provided by an annular internal shoulder 29 of the housing. The block 24 is threadedly coupled to the head end of the bushing by means of pipe nipple 31.

The three bellows are of an axially expanding type. The sensing bellows 19 is located in the recess 27. It is sealed at its upper end to the bushing 26; its bottom end 32 is exposed through the recess to the interior of the associated tank 15. The interior of the sensing bellows connects by means of a passage 33 through the pipe nipple with the common chamber 23. The pressure responsive bellows 21 and 22 are mounted at their bottom ends to the top surface of block 24 and extend upwardly in parallel spaced relation to each other. The common chamber 23 connects through a port 34 and a bellows contraction stop tube 35 with the interior of bellows 22. It also connects through a flow control unit 36 (FIGS. 1, 3–7) with an annulus 37. The latter connects through a port 38 and a bellows contraction stop tube 39 with the interior of bellows 21. The passage through the control unit is defined by an elongated channel 41 and a connecting orifice 42. The orifice is restricted relative to the port 34 associated with bellows 22.

Each of the bellows 21 and 22 has a top end plate 43 from which extends an upright threaded post 44 (FIGS. 1, 2) carrying a spacer nut 45. A pair of parallel links 46 spaced by one of the nuts is pivoted at one end upon a pair of pins 47 projecting from opposite faces of the nut; the opposite ends of the links are pivoted upon a stationary rod 48. A second similar pair of links 49 is similarly pivoted at opposite ends respectively upon its related nut and upon the rod 48. A spacer pin 51 is supported between links 46; and a similar spacer pin 52 is supported between links 49.

The bellows system 16 is filled with an oil conventional to bellows of this nature. The oil is of a type having a flat viscosity curve such as is characteristic of silicone oils. The oil is slightly pressurized in the system so that the three bellows have a normal condition, as in FIG. 1, in which the free ends of the bellows are clear of their respective stop tubes. In this normal condition, the spacer pins 51 and 52 are at the same level and support a switch plate 53. The latter rests upon grooved neck portions 54 of both spacer pins in a condition of balance or equilibrium. In this respect, an under shoulder at each end of the switch plate rests upon a separate one of the spacer pins. An arm 55 of the plate overlies a depressible switch pin 56. The arm operates in a guide slot 57 formed in a supporting plate 58. The latter bridges a pair of upright sideplates 59 (FIG. 2), mounted to opposite sides of block 24. The switchplate 53 has a pivoted relation to the rod 48 by means of a vertical slot 61 through which the rod passes. A spring 62, hooked in a depending end of the slot below the rod 48, and anchored upon a second rod 63, biases the switchplate 53 downward to seated condition upon the spacer pins 51 and 52. The rods 48 and 63 are supported at their ends in the sideplates 59.

It is apparent that a progressive slow contraction of the sensing bellows 19, as a consequence of gradually increasing pressure applied to it by normal pressure changes developing within the tank 15, will force the oil in the bellows system slowly and evenly through the interconnecting passages into bellows 21 and 22. These latter will accordingly progressively expand axially in equal degree so that their related spacer pins 51 and 52 will act equally upon the switchplate 53 and cause its arm 55 to slide ineffectively over the switch pin 56.

It is also apparent that a sudden contraction of the sensing bellows 19, as a consequence of a sudden rise in the internal pressure of the tank, will force the oil in the bellows system to flow in greater volume through port 35 into bellows 22 than through the restricted flow control unit into bellows 21. As a consequence, bellows 22 will expand axially relative to bellows 21 and will force by means of its related spacer pin 51 the switchplate counterclockwise so as to actuate the switch pin 56.

The relay 11 is designed to operate in a temperature range of −40° to 100° C. In this range, the viscosity of the bellows oil will be high at cold temperature and low at hot temperature. To obtain a proper operating response of the relay throughout this range, the rate of flow of the oil in the bellows system through the restricted orifice 42 to the bellows 23 should be substantially constant. The objective of the flow control unit 37 is to maintain this substantially constant rate of flow throughout the temperature range. To this end, the flow control unit 36 (FIGS. 1, 3–7) includes a bimetal thermostatic blade 64 located in the channel 41. The blade cooperates in the manner of a gate relative to the inner end of the orifice 42 to permit increased or decreased flow from the common chamber 23 to bellows 21 as needed to compensate for changes in the viscosity of the oil in the system.

The control unit represents a decided advantageous feature of the relay. It is a separable unit adapted to be removably inserted in one end of the common chamber 23. The control unit includes a cylindrical core 65 in which the channel 41 is formed. The channel is of square cross section and opens through the forward end of the core. The opposite end is closed by the rear end of the core. The blade 64 is riveted at one end 67 to the bottom of channel 41 so that its opposite free end overlies the inner end of the orifice 42. The latter opens radially through the core. A pair of parallel spaced setscrews 68 and 69 in the core project radially into the channel intermediately of the ends of the blade. Screw 68 is adjustably set into engagement with the blade so as to space the free end of the blade at a predetermined normal clearance from the orifice 42, as in FIG. 5. The adjustment is made in accordance with a given viscosity of the bellows oil at ambient room temperature, substantially at 25° C. The second screw 69 is adjusted so as to project slightly into the channel 41 with a predetermined normal clearance from the blade, as in FIG. 5. Its function is to prevent the blade, as indicated in FIG. 7, during hot temperature from deflecting to a closed condition over the orifice, and to keep the blade sufficiently clear of the orifice so as to maintain a proper flow of bellows oil through the orifice.

An annular land 71 of the core separates a short forward portion from an elongated rear portion of the core. A split spring sleeve 72 encases the rear portion of the core so as to cover over a corresponding longitudinal open area of the channel 41. The split ends of the sleeve define a slot 73 which is wide enough to expose the exit end of the orifice 42 and the heads of the setscrews 68 and 69, as best seen in FIG. 3.

The control unit 36 is insertable through an opening 74 of block 24 so as to enter the land portion 71 of the core and an adjacent part of the split sleeve 72 into the common chamber 23. In entering the control unit, the spring sleeve is squeezed to contract it slightly so as to allow it to obtain a springtight fit in the common chamber. The block opening 74 is sealed by means of a removable screwplug 75.

By means of this arrangement, when due to low temperature the viscosity of the bellows oil is high, the blade 64 will deflect, as in FIG. 6, away from the orifice 42 in the manner of a gate so as to allow easier and greater flow of the oil from the channel 41 through the orifice 42. At hot temperature when the oil viscosity is low, the blade will flex closer to the orifice so as to restrict the flow through the orifice, as in FIG. 7.

It can be seen that if an adjustment is required in the blade clearance relative to the orifice 42, the control unit 36 may be removed for that purpose through the block opening 74. To do this, a cover plate 76 is first removed from the housing 12; and the block 24 together with its superstructure is lifted out of the housing after the block has been unscrewed from the pipe nipple 31. The screwplug 75 may then be removed to allow the control unit 36 to be pulled out of the block. The setscrews 68 and 69 may then be adjusted through the sleeve slot 73 to obtain any needed adjustment in the blade clearance.

What is claimed is:

1. A fluid flow control unit comprising a block having an elongated chamber open at one end, an inlet port to the chamber, and an outlet port from the chamber, a fluid flow regulating cartridge removably insertable through the open end into the chamber for maintaining restricted flow of fluid from the inlet port to the outlet port at a controlled rate despite changes in the viscosity of the fluid, and removable closure means for sealing over the open end of the chamber; wherein the flow regulating cartridge comprises an elongated body, a channel extending longitudinally into the body having an open end registrable with the inlet port and having a radial orifice at its opposite end registrable with the outlet port, and a thermostatic blade having one end fixed in the channel and having its opposite end in spaced underlying relation to an inner end of the orifice, the blade being responsive to the ambient temperature of fluid flowing in the channel from the inlet port so as to flex toward the orifice accordingly as the temperature increases and the fluid viscosity decreases, and to flex away from the orifice accordingly as the temperature decreases and the fluid viscosity increases.

2. A flow control unit as in claim 1, wherein adjustable setscrew means is provided in the body for selectively adjusting the clearance of the said opposite end of the blade relative to the inner end of the orifice, and other adjustable setscrew means is provided for preventing the blade from closing fully upon the orifice.

3. A flow control unit as in claim 2, wherein the channel opens lengthwise through a bottom area of the body, and a removable split sleeve covers over the lengthwise opening having a longitudinal slot through which the adjustable setscrew means and the other adjustable setscrew means are exposed.

* * * * *